(12) United States Patent
Brown

(10) Patent No.: US 7,309,521 B2
(45) Date of Patent: Dec. 18, 2007

(54) HEADLINER APPARATUS WITH FOAM IMBEDDED NVH PAD

(75) Inventor: Bari Brown, Ann Arbor, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 492 days.

(21) Appl. No.: 10/862,219

(22) Filed: Jun. 7, 2004

(65) Prior Publication Data

US 2004/0222673 A1 Nov. 11, 2004

Related U.S. Application Data

(63) Continuation-in-part of application No. 10/324,444, filed on Dec. 19, 2002, now Pat. No. 6,939,491.

(51) Int. Cl.
*B60R 13/08* (2006.01)

(52) U.S. Cl. ............... 428/223; 296/214; 428/304.4; 428/316.6

(58) Field of Classification Search ............... 296/214; 428/304.4, 316.6, 223
See application file for complete search history.

(56) References Cited

U.S. PATENT DOCUMENTS

| | | | |
|---|---|---|---|
| 5,976,295 A | 11/1999 | Ang | |
| 6,120,090 A | 9/2000 | Van Ert et al. | |
| 6,204,209 B1 | 3/2001 | Rozek et al. | |
| 6,413,613 B1 | 7/2002 | Byma | |
| 6,475,937 B1 | 11/2002 | Preisler et al. | |
| 6,555,042 B1 | 4/2003 | Mola et al. | |
| 6,655,730 B2 | 12/2003 | Yamagata et al. | |
| 6,685,262 B1* | 2/2004 | Tiesler et al. | ............... 296/214 |
| 6,776,944 B2* | 8/2004 | Kelman et al. | ............... 264/138 |
| 6,939,491 B2* | 9/2005 | Brown et al. | ............... 264/46.4 |
| 2001/0046587 A1 | 11/2001 | Michael et al. | |
| 2002/0001706 A1 | 1/2002 | Yamagata et al. | |
| 2003/0021956 A1 | 1/2003 | Preisler et al. | |
| 2003/0026968 A1 | 2/2003 | Kojima | |
| 2003/0044580 A1 | 3/2003 | Gorowlcz et al. | |
| 2004/0222673 A1 | 11/2004 | Brown | |

FOREIGN PATENT DOCUMENTS

| | | |
|---|---|---|
| DE | 19958374 | 6/2000 |
| EP | 0 411 376 | 2/1991 |
| EP | 1 038 649 | 7/2001 |
| JP | 08113096 | 10/1994 |
| JP | 10016688 | 1/1998 |

\* cited by examiner

*Primary Examiner*—Allan R. Kuhns

(57) ABSTRACT

A vehicle headliner assembly (152) includes a headliner structural layer. A foam beam (174) is joined to the headliner structural layer. An NVH pad (156) is partially embedded within the foam beam (174). A method of forming a headliner structure is provided. The method includes forming a headliner main body (170). The headliner main body (170) is positioned in a mold (220) that has a recess (224). The mold (220) is closed. Foam is introduced into the recess (224) to form a foam beam (174) and to join the foam beam (174) to the headliner main body (170). A portion of an NVH pad (156) is embedded in the foam.

8 Claims, 5 Drawing Sheets

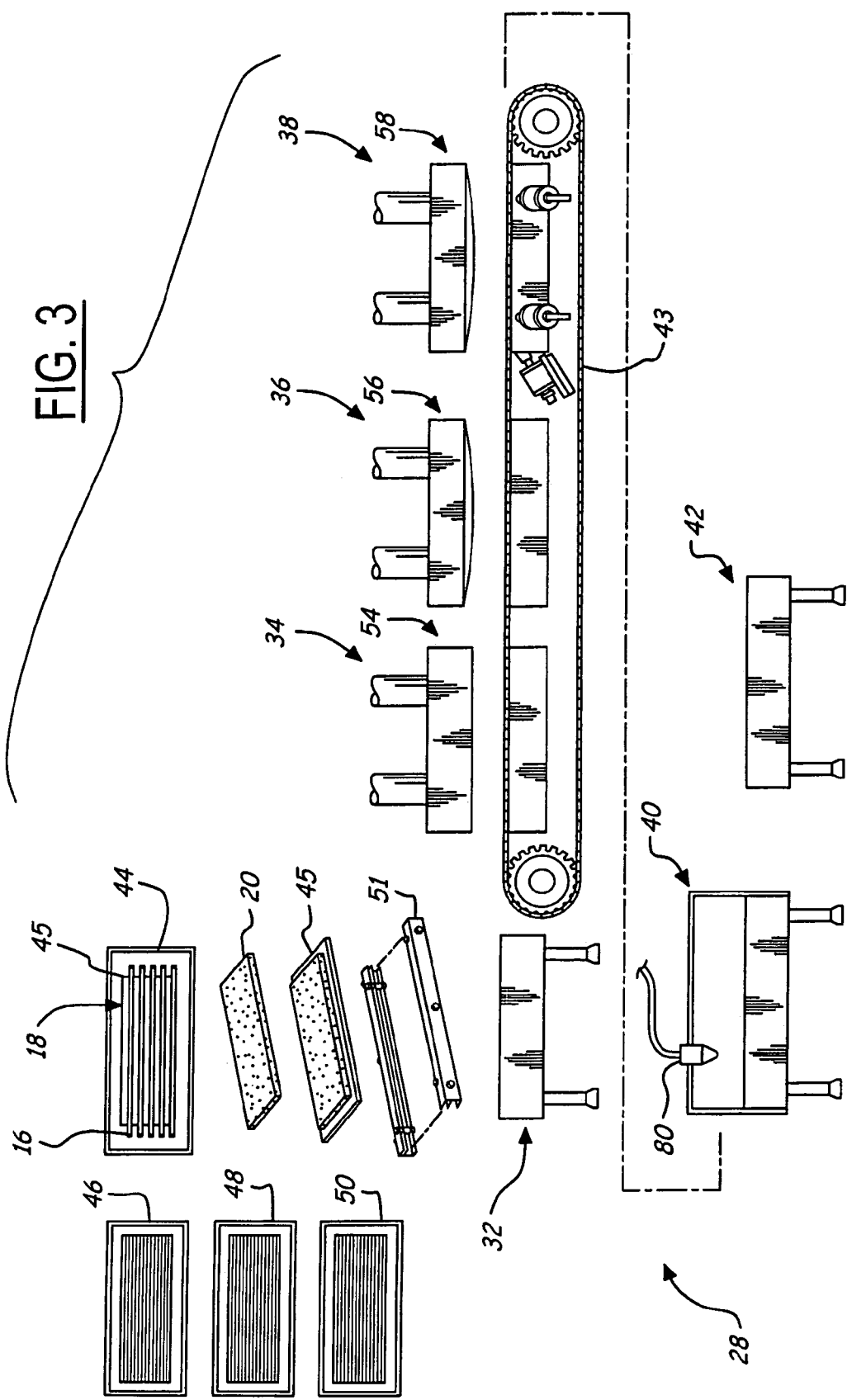

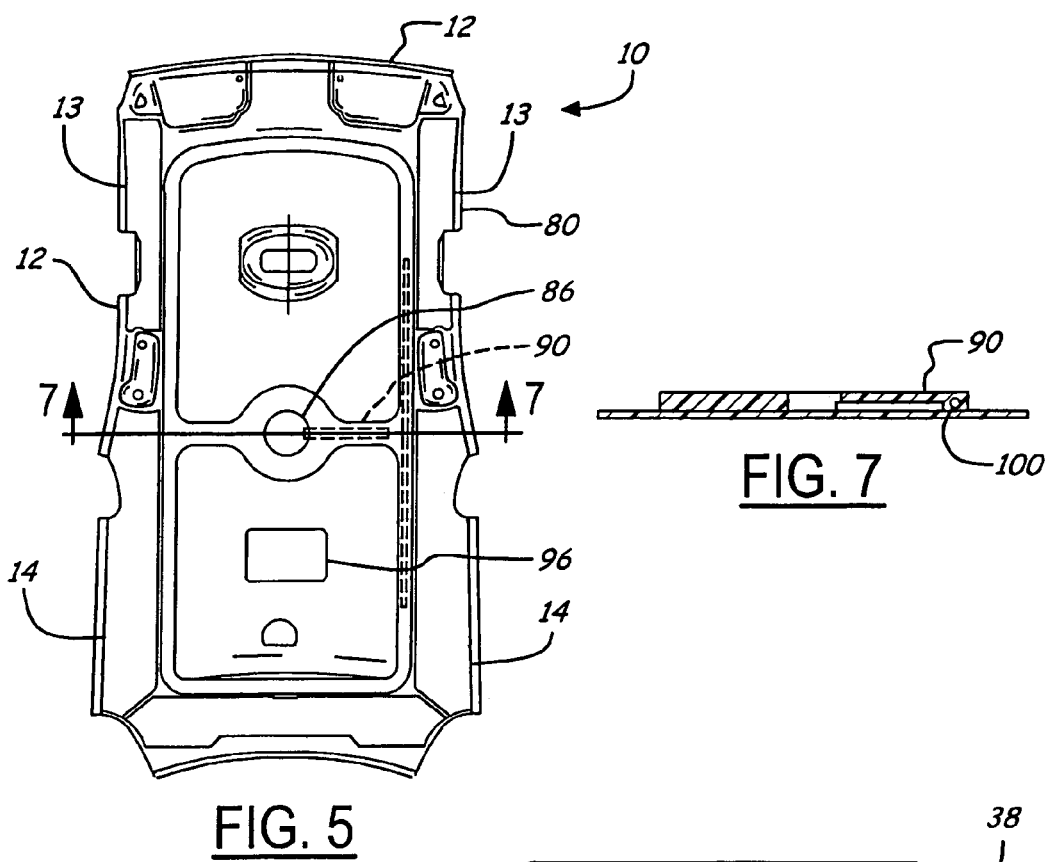
FIG. 5
FIG. 7
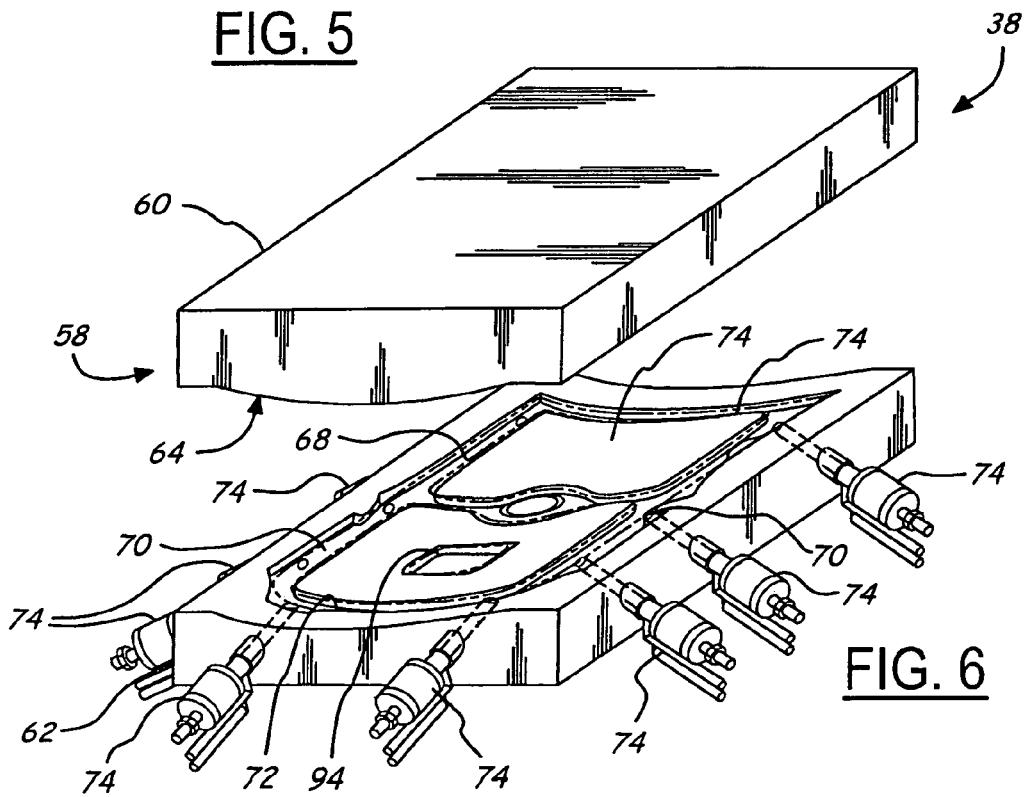
FIG. 6

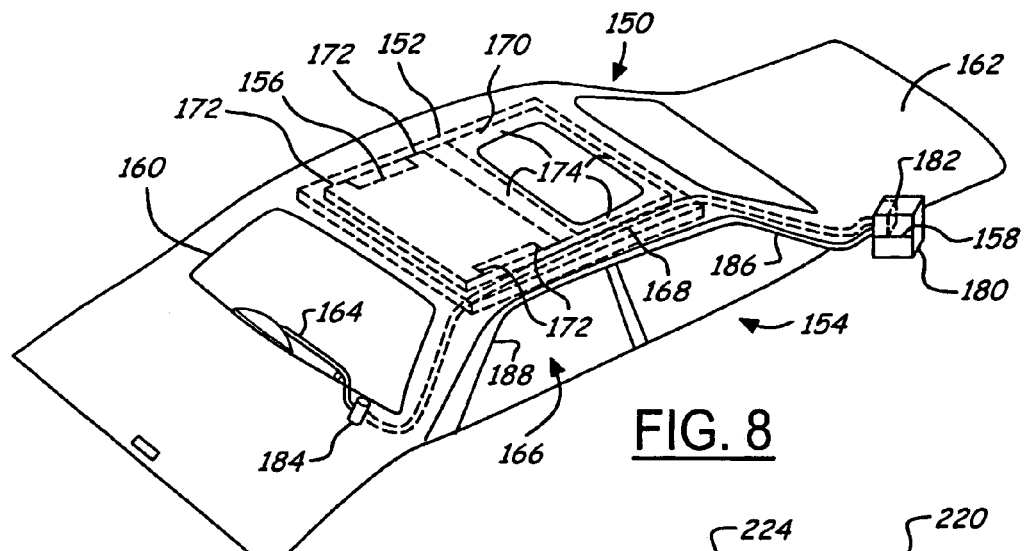
FIG. 8
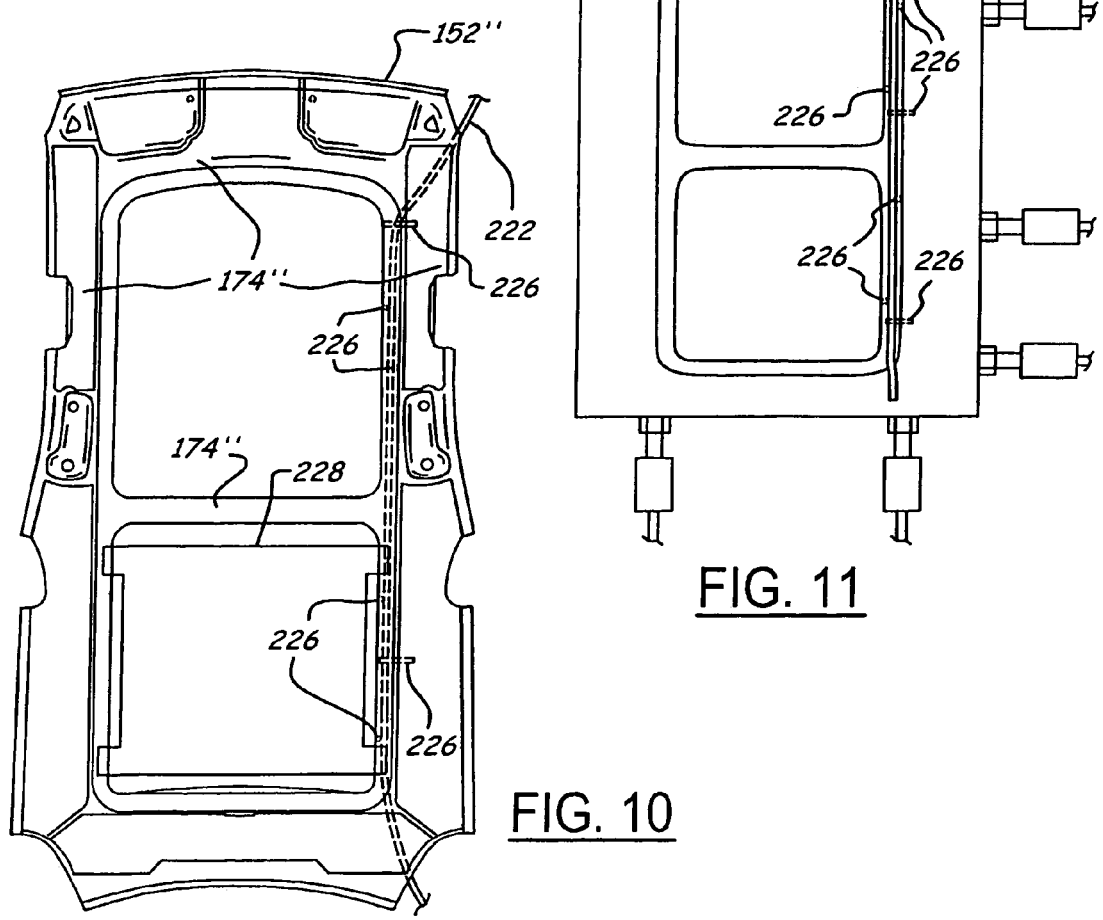
FIG. 10
FIG. 11

HEADLINER APPARATUS WITH FOAM IMBEDDED NVH PAD

RELATED APPLICATION

The present application is a continuation-in-part (CIP) application of U.S. patent application Ser. No. 10/324,444 entitled "FOAM IN PLACE URETHANE FOR STRUCTURAL HEADLINERS", filed on Dec. 19, 2002, now U.S. Pat. No. 6,939,491, which is incorporated by reference herein.

TECHNICAL FIELD

The present invention relates to headliner structures of a vehicle. More particularly, the present invention relates to the integral joining of components and systems into a vehicle headliner structure having shaped structural foam beams.

BACKGROUND OF THE INVENTION

Modem vehicles typically include a headliner structure and various noise, vibration, and harshness (NVH) apparatuses and may also include a rear window wiper and washer fluid system. The headliner structure commonly refers to the covering of the interior surface of a vehicle roof panel. The headliner structure covers an overhead area within the vehicle and provides an esthetically pleasing interior. The NVH apparatuses are typically used throughout the vehicle to reduce noise and kinetic energy levels experienced within the vehicle by an occupant thereof. The rear window washer system is utilized to clean and clear a rear window of the vehicle for improved viewing of an area rearward of the vehicle.

A headliner may be formed or manufactured using various techniques. Many headliners include energy absorbing foam pads, which may be adhered or applied to a headliner structure. The foam pads provide energy absorption during a collision event. One method of forming the pads includes the molding of a block of foam, the slicing of the block into panels, the die-cutting of the panels, and the compression molding of the panels to form the pads. The pads are then attached to a preformed headliner body using assembly dies and an adhesive. Because of the multiple steps involved with forming the pads and attaching the pads to the headliner, this method is time consuming, labor intensive, costly, and also results in significant amount of material waste.

Another technique for forming pads includes the use of deformable foam inserts. The foam inserts are disposed on side edges of a headliner. The method includes the positioning of a cover layer, a foam panel, and preformed foam inserts in a mold. A flexible backing layer is draped over the foam panel and foam inserts. Suitable adhesives are also positioned between the cover layer and the foam panel, and between the foam panel and the foam inserts. The foam panel and the foam inserts are then compression molded, which stiffens the backing layer. This method also includes multiple steps for forming the inserts and attaching the inserts to the remainder of the headliner, which complicates and increases the expense of headliner production.

Another known process applies foam in place technology to provide energy absorbing pads at contact areas adjacent to impactable structures, such as roof panel edges of a vehicle. This process includes simultaneously forming an energy absorbing member at contact areas and joining the energy absorbing member to a main body of the headliner assembly proximate to a periphery of the body. While this process significantly reduces the time and manufacturing costs compared with other prior methods, the process complicates the headliner structure and the handling during production and installation because of the localized pads.

Another technique forms structural beams of foam extending across a major dimension of the headliner. Although such beams can reinforce the headliner to reduce flexing during handling and to reduce the difficulty of installing the headliner, the beams are limited or incapable of supporting accessories or components and addressing localized acoustic problems.

The NVH apparatuses and the rear window washer system are separate entities from that of the headliner structure. NVH apparatuses are typically in the form of an insulative pad and are located in voids or open spaces within a vehicles structure. One prior method of utilizing an NVH apparatus to improve NVH levels above a vehicle occupant is to adhere or hot melt an NVH pad to a headliner structure after formation thereof to increase NVH capabilities of the headliner. The hot melting process can be time consuming and is thus undesirable. Rear window washer systems typically receive power and washer fluid via a designated set of wires and a fluid hose, respectfully, which are extended, through or along a vehicle frame or support structure that is separate and above the headliner structure. This individualistic separation between the headliner structure, the NVH apparatuses, and the wiring and fluid hose of the rear window washer system increases the number of components and the number of steps involved in production of a vehicle and thus increases complexity.

It is desired within the production of any product to minimize the number of system components, the time and costs to manufacture the product, and the inventory levels corresponding to that product. Thus, there exists a need for an improved headliner structure and method of forming the same, which accounts for the above-stated disadvantages associated with prior headliner structures, NVH apparatuses, and rear window washer systems.

SUMMARY OF THE INVENTION

The present invention overcomes the above disadvantages by providing a method for forming a headliner assembly or other internal finish panel having a foam in place structural member joined to a main body and shaped at a location or selected area identified for accessories or acoustic response. According to one embodiment of the invention, a vehicle headliner assembly includes a headliner structural layer. A foam beam is joined to the headliner structural layer. An NVH pad is partially embedded within the foam beam.

In another embodiment of the present invention a method of forming a headliner structure is provided. The method includes forming a headliner main body. The headliner main body is positioned in a mold that has a recess. The mold is closed. Foam is introduced into the recess to form a foam beam and to join the foam beam to the headliner main body. A portion of an NVH pad is, embedded in the foam.

By using a mold having multiple recesses, a headliner assembly may be formed with multiple support beams. Similarly, if the recesses are joined in fluid communication, the beams may be joined to form a frame over a major area of the vehicle roof. A major area as used in this description refers to an expanse of surface area not necessarily rectangular extending beyond a midpoint of the roof area and along at least two of a length, a width, and a diagonal of the roof area toward, but not necessarily at, the ends of the vehicle roof section being covered by the headliner. According to another embodiment of the invention, foam may be injected simultaneously or sequentially into one or more recesses, and the foams may have different densities and/or chemistries. Alternatively, the mold in place operation may involve other processes for introducing foam into the recesses of a lower mold part. Regardless of how the foam is introduced to the recess or recesses in the mold parts, the beam protects or supports accessories at the headliner.

Moreover, the foam may be shaped by recesses to form pads located as desired, for example, between beams or within framed areas, to affect acoustic energy such as buzzes, squeaks and rattles by means of the headliner.

When the beam is shaped to surround a component area, the beam may provide important protection for the component or may support the component. Similarly, wiring may be embedded in a beam for mounting the wiring in position. In addition, headliner areas, for example, areas intermediate beams, or enclosed by a frame of beams may be provided with molded pads of acoustically damping foam or other foam chemistries that reduce buzzes, squeaks and rattles (BSR).

The integration of an NVH pad into the formation of a headliner structure simplifies the number of separate components within a vehicle and thus complexity of the vehicle. The reduction in vehicle components decreases manufacturing time and costs.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference should now be had to the embodiments illustrated in greater detail in the accompanying figures and described below by way of examples of the invention wherein:

FIG. 3 is a schematic view of a production-line arrangement for manufacturing the headliner assembly;

FIG. 5 is a top view of a headliner assembly showing modified beam structure according to the present invention;

FIG. 6 is a perspective view of the mold having recesses for forming the foam beams shown on the headliner of FIG. 5;

FIG. 7 is a sectional view taken substantially along the line 7-7 in FIG. 5;

FIG. 8 is a view of a vehicle overhead system incorporating a headliner assembly in accordance with an embodiment of the present invention;

FIG. 10 is a bottom view of a headliner assembly illustrating an alignment pin configuration in accordance with an embodiment of the present invention; and FIG. 11 is a top view of a mold portion illustrating an alignment pin configuration in accordance with another embodiment of the present invention.

DETAILED DESCRIPTION

Figure 1:
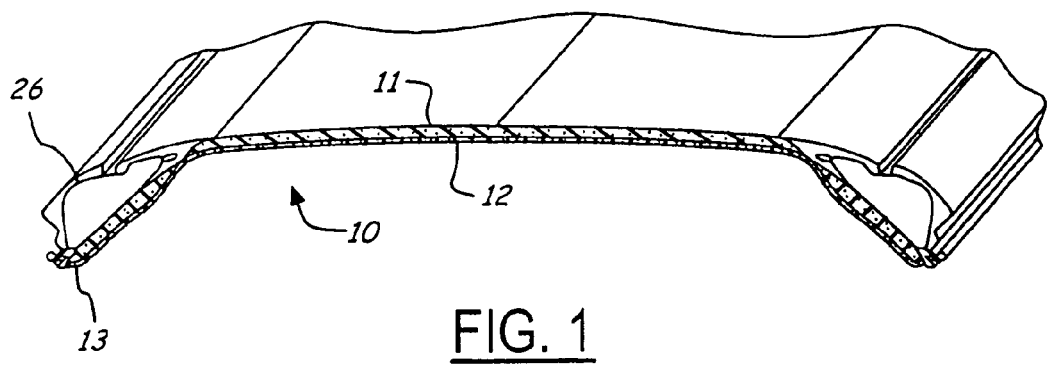
FIG. 1 is a sectional, perspective view of a headliner assembly according to the present invention.
Figure 2:
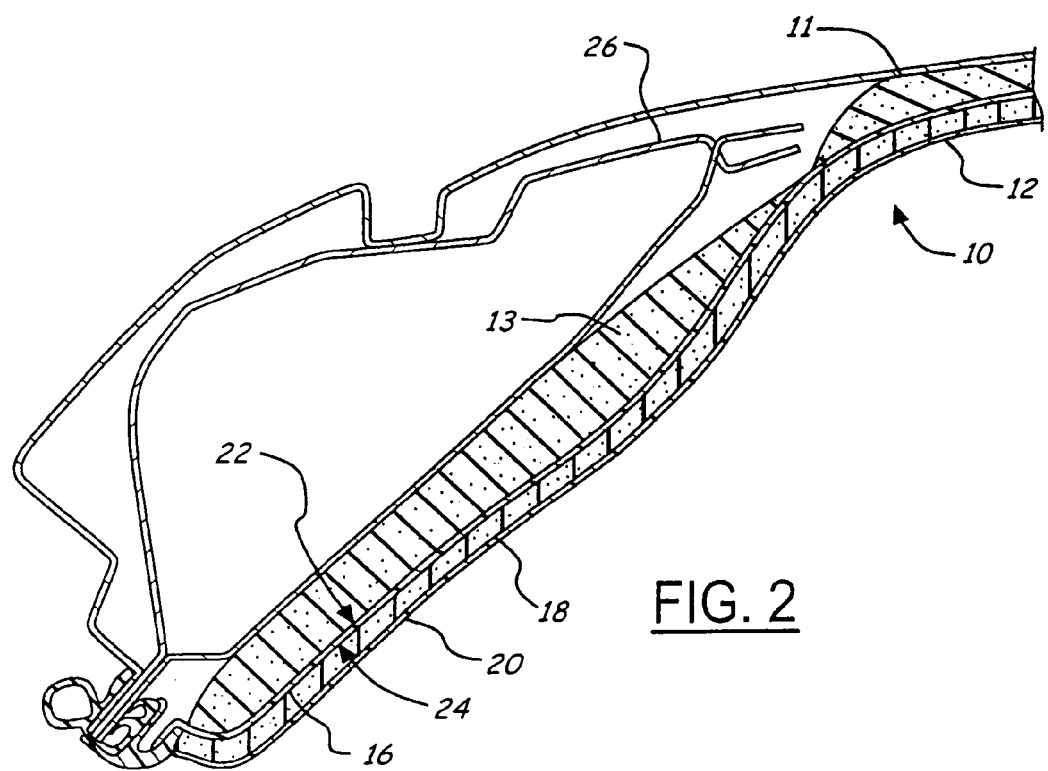
FIG. 2 is an enlarged fragmentary sectional view of the headliner assembly of FIG. 1.

Referring first to FIGS. 1, 2 and 5, a headliner assembly 10 according to the invention is adapted to be mounted to a roof 11 of a motor vehicle. The headliner assembly 10 includes a main body 12 that is reinforced by at least one and preferably, a plurality of structural foam beams. In the preferred embodiment, a forward beam 13, a mid beam 14, a rear beam 15 and longitudinal beams 17 and 19 are formed on and joined to the main body 12 near the periphery of the main body 12. The main body 12 has a first-or backing layer 16, a second or substrate layer 18 and a cover layer 20. The backing layer 16 is preferably a relatively stiff, semi-flexible scrim layer, and has a first or upper surface 22 that is positioned proximate the interior surface of the roof 11 of the vehicle, and a second or lower surface 24. The substrate layer 18 is attached to the lower surface 20 of the backing layer 16, such as with an adhesive. Nevertheless, changes in the structure forming the substrate 18 are also within the scope of the present invention.

While the main body 12 and the substrate layer 18 may comprise any suitable material, in the preferred embodiment illustrated, the substrate layer 18 preferably comprises a thermoformable rigid urethane layer sandwiched between two fiberglass layers. The cover layer 20 may be any suitable cover material, such as cloth, vinyl or foam backed leather, and provided with or without a padding layer depending upon the use characteristics required. The cover layer 20 is attached to the substrate layer 18, preferably with an adhesive. Alternatively, the headliner assembly 12 may be manufactured without a backing layer 16 and/or a cover layer 20 if not required for a particular application.

The front beam 13, mid beam 14, rear beam 15 and side beams 17 and 19 may be disposed proximate or inwardly of peripheral portions of the roof 11 when the headliner assembly 10 is mounted to the roof 11. For example, as shown in FIGS. 1, 2 and 5, the beams 17 and 19 are disposed proximate side rails 26 of the roof 11 when the headliner assembly 10 is mounted to the roof 11, such that the beams are positioned interiorly of the side rails 26. The number of beams, and the size and shape of each beam may be varied depending on the application. Nevertheless, at least one of the beams, for example, mid beam 14, includes a mid portion 84 that borders a selected component area.

The beams 13, 14 and 15 are made of a foam that may be energy absorptive but other compositions are also within the scope of the present invention. While the foam may comprise any suitable material, in a preferred embodiment illustrated, the foam comprises a mixture of isocyanate and resin, which is polyurethane commercially available from several sources. Advantageously, the beams 13, 14, 15, 17 and 19 are molded directly onto the backing layer 16 such that the beams are simultaneously formed and joined to the backing layer 16 in a single operation, which is described below in greater detail. Alternatively, the beams may be molded directly onto the substrate layer 18 if the backing layer.16 is eliminated.

In the preferred embodiment, the beams 13, 14, and 15 are joined by forming in one piece with the side beams 17 and 19. Such an arrangement forms a frame 25 of structural foam that rigidifies the entire headliner assembly. Nevertheless, it is to be understood that beams according to the invention described in detail below can be formed individually without joining other beams, as desired, without departing from the scope and spirit of the present invention. In any event, at least one beam is formed to include a selected area surrounded by the foam forming the beam.

FIG. 3 shows a, production line arrangement 28 according to the invention for forming the headliner assembly 10. The production-line arrangement 28 includes a component storage area 30, a loading station 32, a heating station 34, a forming station.36, a foam-in-place molding station 38, a cutting station 40, and a fixture installation station 42. The production-line arrangement 28 further includes a conveyor system 43, such as a chain conveyor, for transporting components between the loading station 32, the heating station 34 and the forming station 36.

Figure 4:
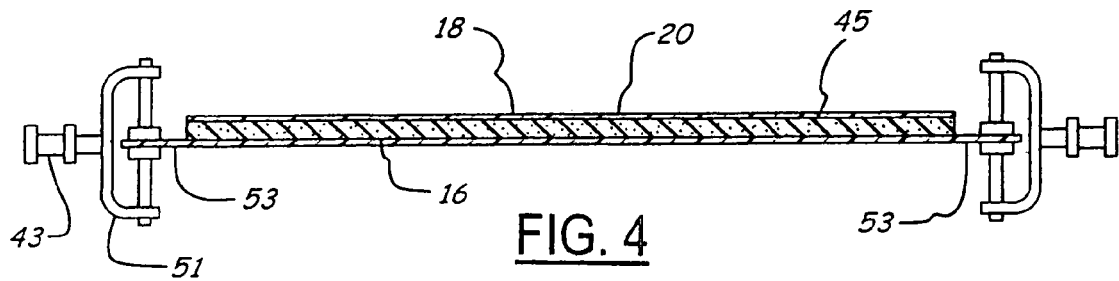
FIG. 4 is a cross-sectional view of a blank used to manufacture the headliner assembly, wherein the blank is supported by a frame.

In the preferred production line arrangement 28, the component storage area 30 preferably includes a source 44 of blanks 45, wherein each blank 45 comprises a substrate layer 18 with a backing layer 16 attached thereto. The component storage area 30 further includes a plurality of sources 46, 48 and 50 of cover layers, wherein each cover layer source 46, 48 and 50 contains cover layers that are different in color and/or composition compared with another of the cover layer sources 46, 48 and 50. At loading station 32, a blank 45 and a particular cover layer 20 selected from one of the cover layer sources 46, 48 and 50 are positioned in a transport frame 51 (FIG. 4). The frame 51 is then mounted on the conveyor system 43. An adhesive layer may also be positioned between the blank 45 and the cover layer 20 at station 32.

As shown in FIG. 4, the backing layer 16 of the blank 45 of the preferred embodiment preferably has an extended portion 53 that-extends beyond the substrate layer 18 of the blank 45. Preferably, the transport frame 51 grips the extended portion 53 to thereby support the blank 45 and the cover layer 20 on the conveyor system 43. As another example, a conveyor system may be provided with upper and lower chains that grip the extended portion 53 therebetween. The substrate layer 18 of the blank 45 may be appropriately sized to closely match the final size or outline of the headliner assembly 10, to thereby reduce scrap or waste material. Of course, other transports may be used without departing from the invention. The blank 45 and the cover layer 20 are then transferred by the conveyor system 43 to the heating station 34 shown in FIG. 4.

The heating station 34 includes a platen assembly 54 having upper and lower heated platens that engage the blank 45 and the cover layer 20 to thereby heat the blank 45 and the cover layer 20. Preferably, the platen assembly 54 also has a plurality of thermocouples for sensing temperature of the blank 45 and the cover layer 20. Once sufficiently heated, the blank 45 and the cover layer 20 are transferred by the conveyor system 43 to the forming station 36.

The forming station 36 includes a first mold 56 having first and second mold portions for thermoforming the blank 45 and the cover layer 20 to form the-main body 12, such that the main body 12 has a shape that corresponds to a desired shape of the headliner assembly 10. Preferably, both mold portions may also be chilled in any suitable manner, such as by circulating chilled fluid, such as water through the mold portions. The forming station 36 preferably includes multiple molds, similar to the first mold 56, that can be alternately used to form different headliner shapes and sizes. The main body 12 is then transported manually or otherwise to the foam-in-place molding station 38.

The foam-in-place molding station 38 includes a second mold 58 for forming the foam beams on the main body 12, to thereby form the headliner assembly 10. The foam-in-place molding station 38 preferably includes multiple molds similar to the second mold 58 for forming various beam configurations on various headliner configurations as will be described below. As shown in FIG. 6, the mold 58 includes a first or upper mold portion 60, and a second or lower mold portion 62. The upper mold portion 60 has a mold surface 64 that corresponds with the formed shape of the cover layer 20, or the formed shape of a surface of the main body 12 to which the cover layer 20 is attached. The lower mold portion 62 has a mold surface 66 that corresponds with the formed shape of the backing layer 16 of the main body 12.

The lower mold portion 62 includes a plurality of cavities or recesses 68, 70, 72, 73 and 75 for respectively forming the beams 13, 14, 15, 17 and 19. Each of the recesses may be in fluid communication with one or more pour heads 74 that inject or otherwise introduce foam into the particular recess 68, 70, 72, 73 and 75. For example, as shown in phantom line in FIG. 6, each of the recesses is in fluid communication with at least one pour head 74, particularly if the recesses are separated from each other. Each of the recesses may also be in fluid communication with two or more pour heads 74. In the embodiment shown, where all recesses are in fluid communication with each other, a single nozzle or pour head may introduce the foam into the recess. Nevertheless, multiple pour heads may be used to expedite the introduction of foam to the mold 58. The pour heads 74 are connected to one or more sources of foam (not shown), such as a mixture of isocyanate and resin.

At molding station 38, the formed main body 12 is positioned between the mold portions 60 and 62, and the mold portions 60 and 62 are closed together. Next, foam is injected by the pour heads 74 into the recesses 68, 70, 72, 73 and 75. Because foam injected into the larger recesses 73 and 75 requires more time to expand and cure than foam injected into the smaller recesses 68, foam may preferably be first injected into the recesses 73 and 75, and subsequently into the recesses 68 when multiple nozzles are not available. As a result, expansion and curing of the foam may be arranged to conclude in all of the recesses at approximately the same time. The lower mold portion 62 may also be heated preferably in the range of 130° F. to 190° F. for isocyanate and resin to assist in the expansion and curing process of the foam, and to flash off water that may be associated with a mold-release agent applied to the mold parts such as sprayed on wax for an injection molding operation. The multiple pour heads feeding a particular one of the larger recesses may preferably inject foam simultaneously, or in closely spaced stages, so as to provide relatively consistent foam characteristics throughout.

In any event, the mid beam 14 includes a mid bar 84 that includes diverging beam portions that form or surround a component area 86 within the headliner. This is formed by an intermediate wall that diverges the fluid foam to border a selected component area. As a result, the beam provides structural support for and around an accessory component such as a dome light, which may be installed above the headliner. Such a beam protects the accessory or permits mounting to the headliner by the surrounds or partially enclosed walls, without requiring separate construction or assembly after formation of the headliner.

Because the recesses 68, 70, 72, 73 and 75 or others may be separated from each other, the quantity or mass of foam per unit of recess volume delivered by the pour heads 74, which is referred to as injection density of the pour heads 74, can be varied from one to another of the recesses so as to vary the density of the resultant beams. For example, a larger quantity of foam per unit of recess volume can be delivered to narrower recesses 68, such that the resultant beams have a greater density. Consequently, foam density can be increased in areas requiring greater strength, such as areas of the headliner assembly 10 that will be remote from a side rail or roof supporting A-pillar joints of a motor vehicle. Furthermore, foam densities can be decreased in areas requiring less strength so that overall material costs can be significantly reduced. Different foam compositions may also be used under the method according to the invention to form beams having different densities.

The headliner assembly 10 may be precisely formed to achieve relatively close design tolerances with significantly fewer steps and assembly procedures. Because beams are not individually handled and stored, this method involves lower inventory, lower assembly costs and part handling costs compared with prior methods that separately form and install separate support structures and beams.

Moreover, components such as wiring harnesses, preformed foam components such as head impact energy absorbing, for example, pads meeting code standards such as FMVSS 201.a, foam cushions, or other accessories, may also form the intermediate wall. Components to be installed in the headliner may be positioned within the recesses in the cavity or shaped surface, of the female mold half as shown in FIG. 5, for embedding the component partially or completely in the beams formed in the mold, For example, as shown at 90, a wiring harness may be positioned in a predetermined location with respect to functional components to be installed after construction of the headliner. For example, the wiring harness 90 as shown in FIG. 5, extends into the component area 86 so that any component installed above or carried by the headliner may be provided with electrical power through the harness 90. Of course, the other end of the harness 90 is positioned for easy access to a power source or other coupling or connector in the electrical system, and may be made accessible to sources, coupling components or the like by cutting of the headliner assembly after the molding operation, for example, at cutting station 40 discussed below. Nevertheless, the method of constructing the foam beams also serves to embed and mount accessory components such as a wiring harness, energy absorbing member or other vehicle accessory components. Another example is shown at 100 where a plastic tube, for use as a rear window washer conduit, can be embedded in the foam. When the embedded component includes an end piece such as a coupler, the mold may include a dedicated recess that receives the coupling and protects it when the mold is closed.

In addition, it may be appreciated that numerous portions of a motor vehicle interior can be subject to numerous audio disturbances such as buzzes, squeaks or rattles that result from operation of components within the headliner or other parts of the vehicle that are transmitted through the roof panel during operation of the vehicle and its drivetrain. Accordingly, a separate foam-pad, such as overhead pad 96, may be added on the back of the headliner assembly during the foam-in-place process to mute or dampen vibrations at areas subject to resonance or the transmission of audio disturbances. The pad 96 may be made of an acoustic foam that is absorbent-of acoustic waves in the range of 0 hertz to 10,000 hertz. Accordingly, the mold may be modified to include additional channels 94, in fluid communication with or independent of the beam forming recesses, that are filled during the molding operation at workstation 38. These produce a foam pad mounted at selected locations to the headliner providing acoustic control or protecting against buzzes, squeaks and rattles as shown at 96 as predetermined to be desired. The pads may be secured to a main body 12 or other components of the headliner. Alternatively, the noise reduction pads may also be formed in recesses in fluid communication with channels for forming the foam beam so as to be made with the same pour heads used to inject foam into the beam forming channels. Preferably, as shown in the preferred embodiment of FIG. 7, the noise reduction pads are made from an acoustically absorbent foam, and may be smaller, thinner and :thus less, bulky than other portions of the structural beams, particularly when formed adjacent to, or within a peripheral frame formed by foam beams.

When the headliner assembly 10 is transferred to the cutting station 40, which is shown in FIG. 4, a computer controlled, water jet cutting device 80 trims the headliner assembly 10. Trimming may include cutting openings through the headliner assembly 10, for example, within the component area 86 or for communication or access to the couplers or terminals of the embedded wiring. The rigidity and dimensional stability is preferably closely matched to the final size or outline of the headliner assembly 10 so that the amount of trimming required is significantly reduced compared with prior methods of forming headliners. The headliner assembly 10 is then transferred to the fixture assembly station 42 where installation of such fixtures as coat hooks, dome lights, wire couplings and ornaments is completed. The headliner blank may also be trimmed before molding and foam introduction, particularly when couplings may be protected within the headliner during molding.

Referring now to FIG. 8, a perspective view of a vehicle overhead system 150 incorporating a headliner assembly 152 in accordance with an embodiment of the present invention is, shown. The overhead system 150 includes a rear window wiper and washer system 154 and an NVH pad 156. The window washer system 154 directs washer fluid 158 to spray across a rear window 160 of the vehicle 162 and utilizes a conventional style wiper 164 to clear and clean the window 160. The NVH pad 156 minimizes noises and kinetic energy experienced within the interior cabin 166 of the vehicle 162. The window washer system 154 includes a washer fluid line 168, which extends across a headliner structure 170 of the headliner assembly 152. The washer fluid line 168 as well as the tabs 172 of the NVH pad 156 are embedded within foam beams 174 of the headliner structure 170. The headliner structure 170 thus supports the washer fluid line 168 and the NVH pad 156.

The window washer system 154 includes a washer fluid reservoir 180 containing the washer fluid 158. The washer fluid 158 is directed through the washer fluid line 168 via a pump 182 to the rear window 160. The washer fluid line 168 may be directed into the wiper 164. The wiper 164 is operated via a wiper motor 184.

The washer fluid line 168 extends up an A-pillar 186 of the vehicle 162 through the headliner assembly 152 and down a rear or C-pillar 188 of the vehicle 162 to the wiper 164. The washer fluid line 168 may be of various types and styles and may be formed of various materials known in the art. Although a single washer fluid line is shown, any number of which may be utilized.

The NVH pad 156 may also be formed of various materials. The NVH pad 156 may, for example, be formed of rubber, adhesive materials, foam, mastic materials, plastic materials, viscoelastic materials, other materials known in the art, or a combination thereof. The NVH pad 156 may be in the form of a pressed filter board, a fibrous lint-like sheet of material, or may be in some other form. As with the washer fluid line, any number of NVH pads may be utilized.

The NVH pad 156 is supported by the headliner structure 170 via the tabs 172. The tabs 172 are embedded within the foam beams 174 during formation thereof. The tabs 172 are shown as one example of embedding portions of the NVH pad 156 within the foam beams 174, other portions of the NVH pad 156 may be embedded within the foam beams 174. The tabs 172 may be formed of the same or different material as that of the NVH pad 156. The tabs 172 may be an integral part of the NVH pad 156 or may be separate and attached to the NVH pad 156.

Figure 9:
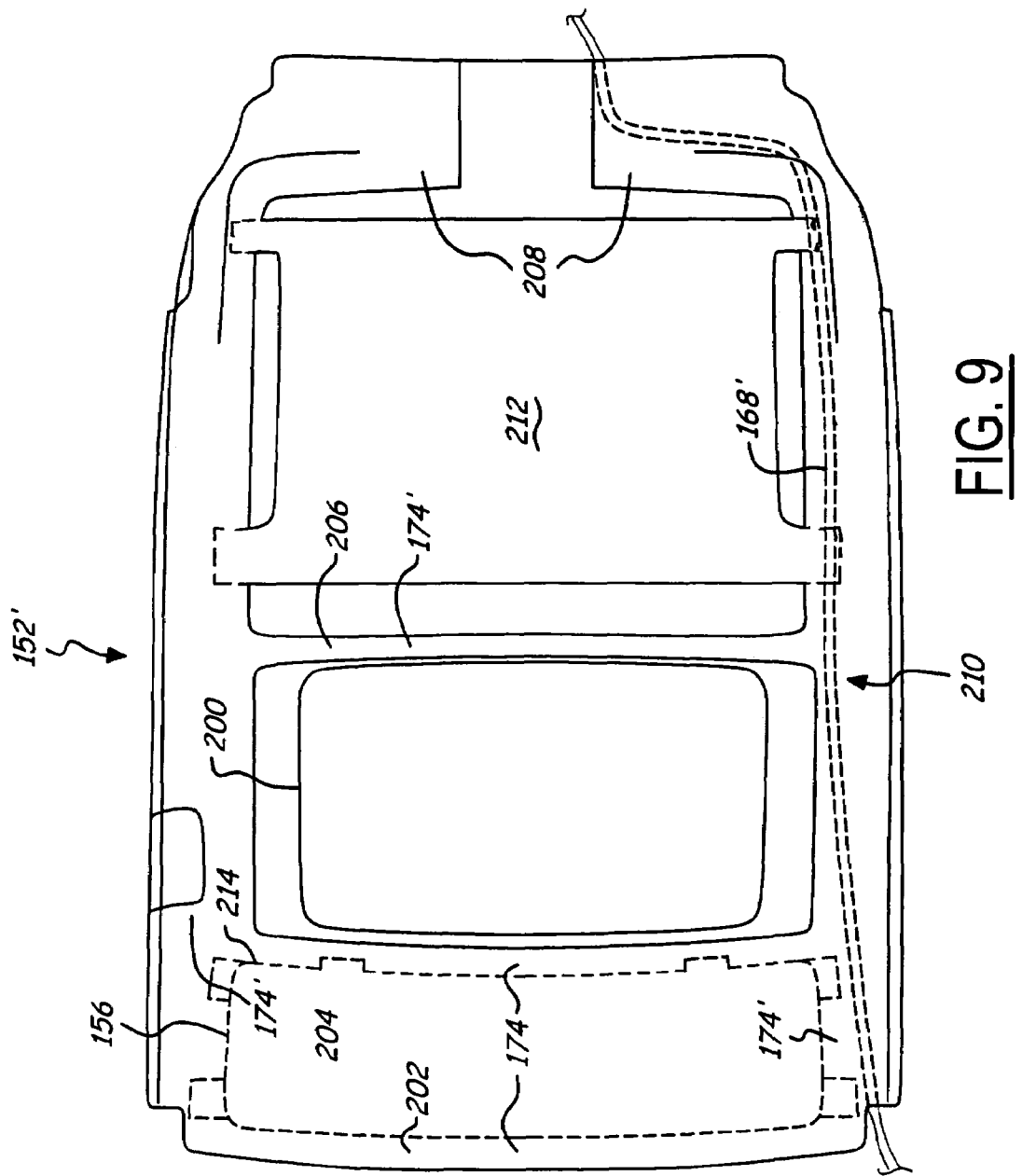
FIG. 9 is a bottom perspective view of a headliner assembly in accordance with another embodiment of the present invention.

Referring now to FIG. 9, a bottom perspective view of a headliner assembly 152' having a sunroof opening 200 in accordance with another embodiment of the present invention is shown. The headliner assembly 152' includes a washer fluid line 168' and one or more NVH pads 156', which are at least partially embedded within the foam beams 174'. The foam beams 174' include a front beam 202, a first mid-beam 204, a second mid-beam 206, and a pair of rear beam sections 208. The washer fluid line 168' extends along a passenger or right side 210 of the headliner assembly 152'. A first NVH pad 212 is shown between the second mid-beam 206 and the rear sections 208. A second NVH pad may be utilized between the front beam 202 and the first-mid beam 204, as is designated and shown by dashed lines 214. The NVH pads 156' may cover any amount of cross-sectional surface area of the headliner assembly 152'.

Referring now to FIGS. 10 and 11, a bottom view of a headliner assembly 152" and a top view of a mold portion 220 illustrating alignment device configurations in accordance with an embodiment of the present invention are shown. A washer fluid line of the headliner assembly 152", such as shown by lines 222, may be applied, held, or attached to the headliner assembly 152" or to a recess 224 of the mold portion 220 prior to positioning of the headliner assembly 152" over the mold portion 220 for formation of the foam beams 174". The washer fluid line may be applied, attached, or held via alignment pins 226 or the like as suggested above. The alignment devices 226 may be of various types, styles, and sizes and may be formed or various materials known in the art. The alignment devices 226 may be coupled to the headliner assembly 152" or to a headliner structure or main body thereof or to the mold portion 220 and are use to maintain position of the washer fluid line during formation of the foam beams 174". Upon formation and curing of the foam beams 174" the alignment devices 226 may remain in the headliner assembly 152" or may be removed. Although the alignment devices 226 are shown as alignment pins, other alignment devices may be utilized, such as alignment tabs, clips, straps, or other devices that may be used to maintain position of the washer fluid line. The alignment devices 226 may also be utilized to maintain the alignment of NVH pads, such as the NVH pad 228, contained within the headliner assembly 152".

The alignment devices 226 may also be utilized to form a location for a washer fluid line. The washer fluid line may be placed between the alignment devices 226 and held in place such that foam may surround and encase the washer fluid line. The alignment devices 226 may also aid in the alignment of the washer fluid line, for example, along the recess of the mold portion 220.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle headliner assembly comprising:
   at least one structural layer;
   at least one foam beam joined to said at least one structural layer; and
   at least one noise, vibration, and harshness (NVH) pad, said pad having at least one tab member partially embedded within said at least one foam beam.

2. An assembly as in claim 1 wherein said at least one headliner structural layer comprises:
   a backing layer; and
   a substrate layer coupled to said backing layer.

3. An assembly as in claim 1 wherein said at least one headliner structural layer comprises a cover layer.

4. An assembly as in claim 1 wherein said at least one headliner structural layer comprises a scrim layer.

5. An assembly as in claim 1 further comprising at least one channel in said at least one foam beam, said at least one channel, having at least one fluid line residing therein.

6. An assembly as in claim 5 wherein said at least one foam beam substantially encases said at least one fluid line.

7. A vehicle overhead system comprising:
   at least one headliner structural layer;
   at least one foam beam joined to said at least one headliner structural layer; and
   a plurality of NVH pads, each of said pads having a tab member thereon, each of said tab members partially embedded within said at least one foam beam.

8. A system as in claim 7 further comprising at least one recess provided between two foam beams, and at least one of said tab members is embedded within said at least one recess.

* * * * *